United States Patent [19]

Thompson

[11] 4,320,426
[45] Mar. 16, 1982

[54] HEAD ASSEMBLY FOR RECORDING ON MAGNETIC DISC

[75] Inventor: Herbert E. Thompson, Los Gatos, Calif.

[73] Assignee: Xerox Corporation, Stamford, Conn.

[21] Appl. No.: 152,976

[22] Filed: May 23, 1980

[51] Int. Cl.³ .......................... G11B 5/50; G11B 5/54; G11B 21/16
[52] U.S. Cl. ..................................... 360/104; 360/105
[58] Field of Search ................................ 360/104, 105

[56] References Cited

U.S. PATENT DOCUMENTS 4,263,630  4/1981  Pierson ................................. 360/104

FOREIGN PATENT DOCUMENTS 52-73709  6/1977  Japan ................................... 360/104

Primary Examiner—Robert S. Tupper
Attorney, Agent, or Firm—Leonard Zalman

[57] ABSTRACT

A pliant magnetic disc recording assembly having two adjacent transducer heads, with the center lines of the heads oriented at an angle to the axis of rotation of the magnetic disc and arcuately spaced with respect to such axis of rotation. The bearing surface of each head has a radius, and each bearing surface extends into the plane of the disc, whereby the disc has a wavy contour over the heads. The orientation, position and shape of the heads causes the disc to have a large wrap angle about each head whereby wear producing forces are distributed over a large area of the disc which lowers stresses on the disc.

4 Claims, 7 Drawing Figures

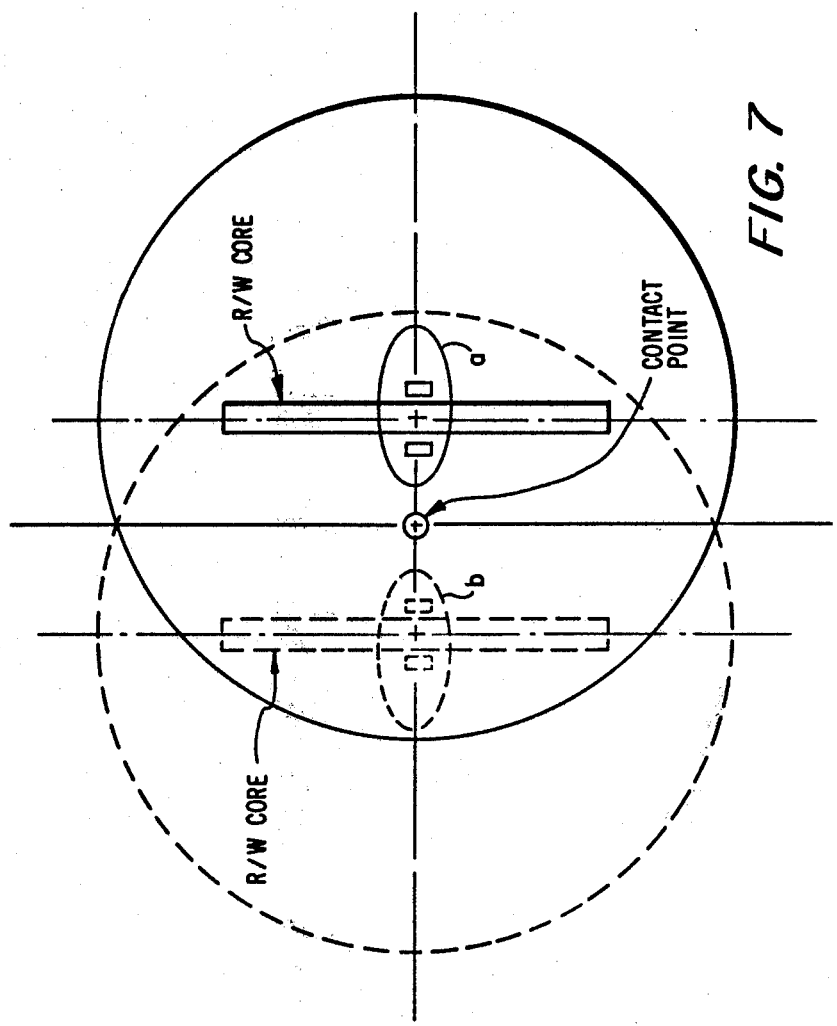

HEAD ASSEMBLY FOR RECORDING ON MAGNETIC DISC

BACKGROUND OF THE INVENTION

Floppy disc systems utilize a thin pliant magnetic disc contained within a cover jacket for recording data. In order to increase data storage capacity, floppy disc systems have been proposed which utilize both sides of the floppy disc for data recording. In one such system, a pair of pliant support arms is used to locate a pair of transducer heads on opposite sides of the floppy disc in an orientation having the transducer heads parallel to the axis of rotation of the floppy disc and arcuately spaced with respect to such axis. The pliant support arms cause the transducer heads to embrace the disc and cause it to have a wavy contour over the transducer heads, with stabilizing platforms adjacent the heads providing a stabilizing effect on the disc. Due in large part to the substantial contact between the stabilizing platforms and the disc, large frictional forces are present in the described system and those forces tend to produce substantial wearing of the disc. Also, with both transducer heads supported in a compliant manner, there is excessive vibration and oscillations of both heads which causes the disc/head spacing to vary and also contributes to wearing of the disc.

Another floppy disc system that records data on both sides of the floppy disc utilizes a fixed transducer head on one side of the disc and a compliant transducer head on the other side of the disc, with both heads aligned along a common axis parallel to the axis of rotation of the disc. To reduce frictional forces, the compliant head has a low mass. However, a head with a low mass is prone to excessive oscillation which can cause excessive variations in disc/head spacing and can result in head/-disc contact and resultant wearing of the disc and heads.

The shortcomings of the prior art systems point out the need for a double sided floppy disc system with a head structure which reduces frictional forces between the heads and the disc and which reduces the oscillations of both heads, such that a nearly constant head/-disc spacing is achieved and wear of the disc and heads is minimized.

SUMMARY OF THE INVENTION

In accordance with the invention, the head assembly for a double sided floppy disc system is comprised of a fixed head for recording on one side of the disc and a head of large mass supported in a compliant manner for recording on the other side of the disc, with the center lines of the heads oriented at an angle to the axis of rotation of the disc and arcuately spaced with respect to the axis of rotation of the disc. The bearing surface of each head has a radius, and each bearing surface extends into the plane of the disc, whereby the disc has a wavy contour over the heads.

The orientation, position and shape of the heads causes the disc to have a large wrap angle about each head whereby wear producing forces are distributed over a large area which lowers stresses on the disc and consequently reduces wear. Since one head is fixed and the other head has a large mass and rigidity, vibrations and oscillations of the heads are minimized whereby it is possible to achieve substantially constant head/disc spacing and to minimize frictional wear. The orientation, position and shape of the heads can locate the region of minimum spacing between the heads and the disc at the read/write gap of the heads which is the desired position for maximum recording efficiency.

BRIEF DESCRIPTION OF THE DRAWINGS

FIG. 7 shows interference fringes produced by the assembly of FIG. 1.

DETAILED DESCRIPTION OF THE INVENTION

Figure 1:
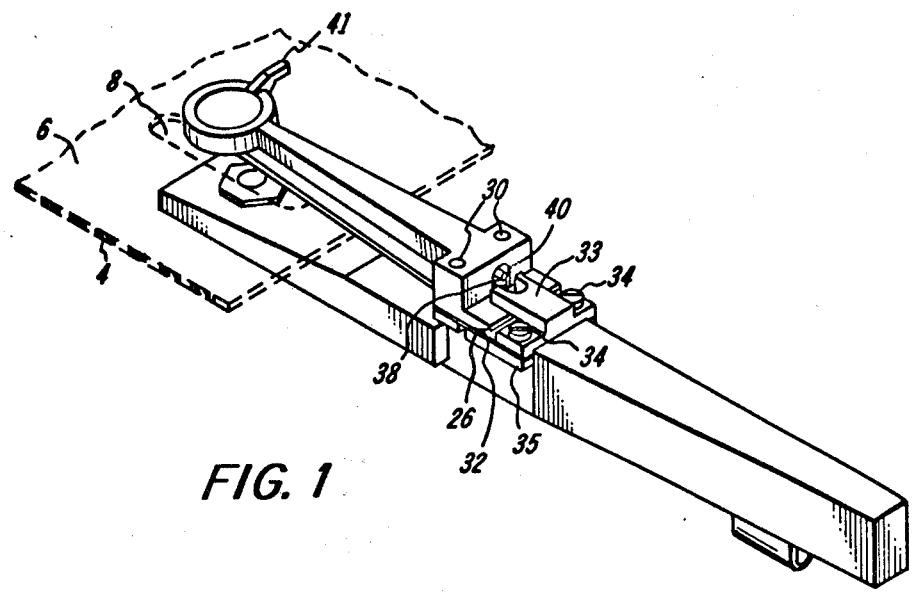
FIG. 1 is a perspective view of a transducer head assembly in accordance with the invention.
Figure 2:
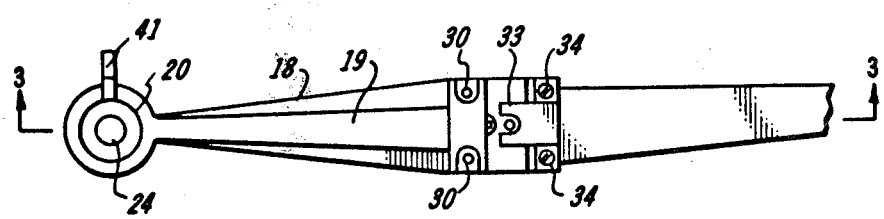
FIG. 2 is a top view of the transducer head assembly of FIG. 1.
Figure 3:
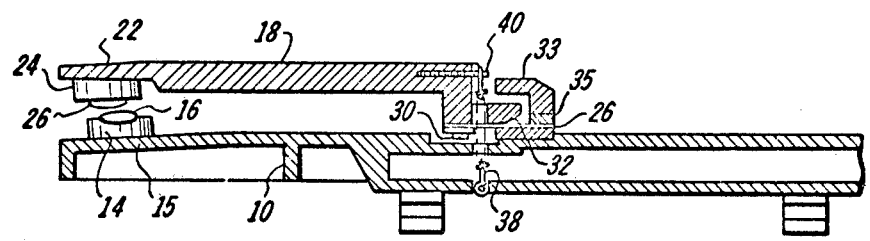
FIG. 3 is a sectional view along line 3—3 of the transducer head assembly of FIG. 1.

Referring first to FIGS. 1, 2 and 3, the head assembly carriage 2 is depicted in conjunction with a floppy disc 4. Since the structure of floppy disc 4 is conventional, for brevity and simplicity there is shown in FIG. 1 only a section of flexible disc 4 and its encompassing jacket cover 6 with access slot 8. Reference may be had to U.S. Pat. No. 3,879,757, and other publications, for details of such features as the central hub and spindle means for gripping and rotating flexible disc 4 and for the lead screw or other type of radial accessing mechanism for moving the carriage 2 along the access slot 8 to a selected radial track position. The jacket cover 6 would be open on one side to permit access by the head portion of the head assembly carriage 1.

Figure 5:
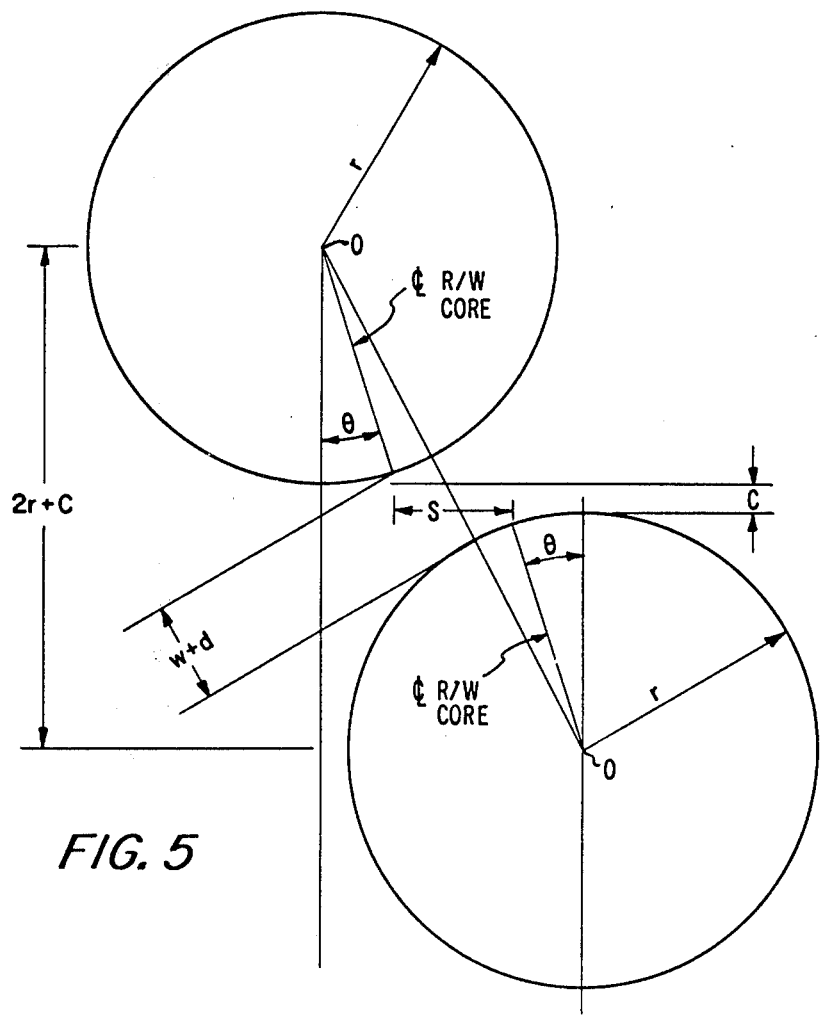
FIGS. 4 and 5 show, in magnified form, the structure, position, and orientation of the transducer heads of the head assembly of FIG. 1.
Figure 4:
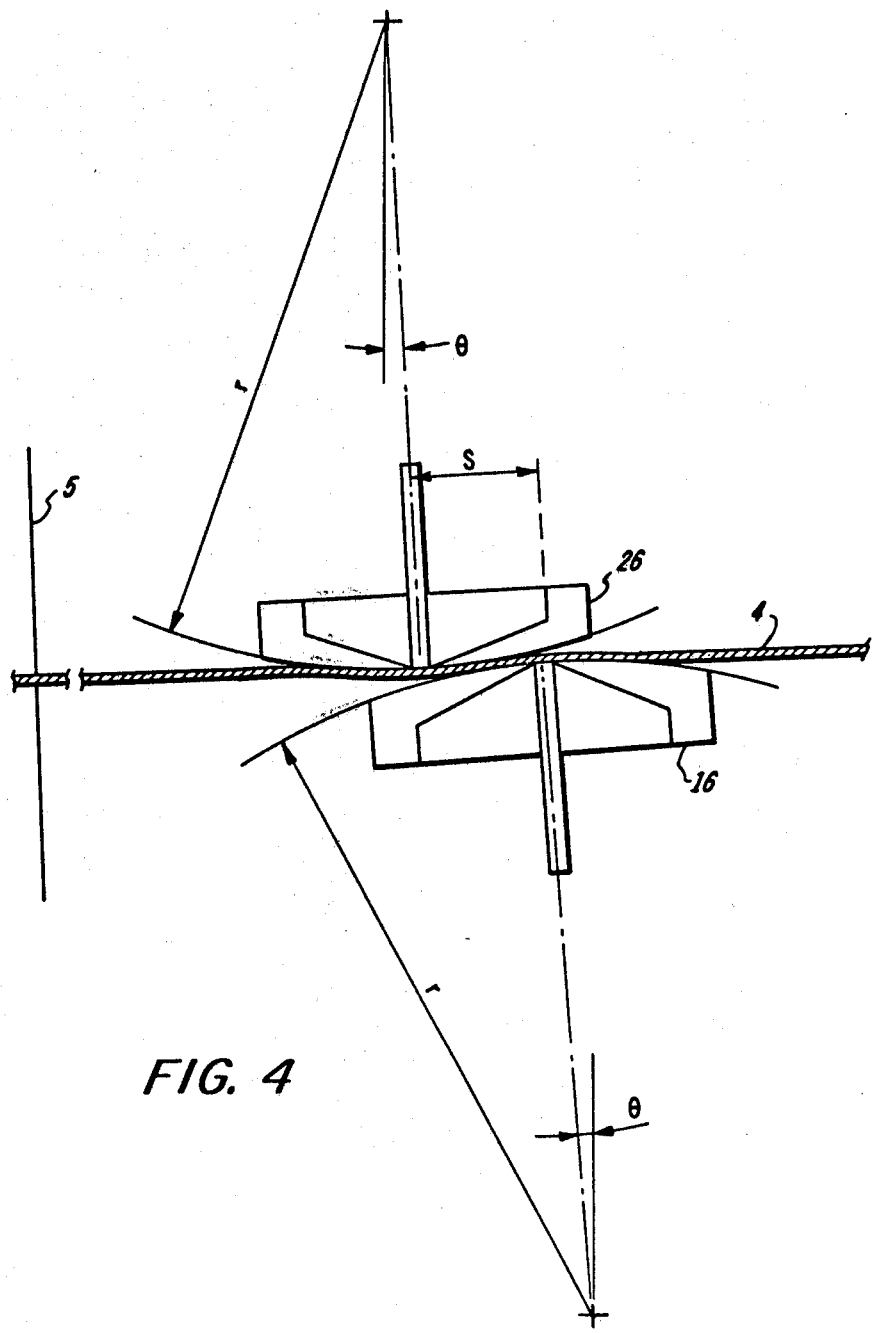

Mounted over an aperture 15 located in a sloping region at the left end of a component 10 of the carriage 2 is what will be referred to hereinafter as the "fixed" transducer 14. As will be explained in detail hereinafter and as best shown in FIGS. 4 and 5, transducer 14 has a curved, convex head portion 16 facing the disc 4 at an angle to the axis of rotation 5 of disc 4. Head portion 16 includes a read/write core and an adjacent erase core which are connected to conventional leads (not shown) and which function in a conventional manner. Fixed transducer 14 is positioned so that the head portion 16 penetrates or intercepts the nominal plane of disc 4 (as best shown in FIG. 4).

Spaced adjacent to carriage component 10 is pivotally mounted a stiff cantilevered support arm 18 having thinned areal section 19 along its length for purposes of reducing weight without reducing rigidity. Arm 18 is raised by tab 41 with a conventional head load/unload solenoid (not shown). A small areal aperture 20 is provided in a sloping section 22 adjacent the free end of arm 18, within which aperture is mounted what will be referred to hereinafter as the "pliant" transducer 24. Transducer 24 also has a curved, convex head portion 26 facing the disc 4 at an angle to the axis of rotation 5 of disc 4 (as best shown in FIG. 4). Head portion 26 also includes a read/write core and an adjacent erase core which also are connected to conventional leads (not shown) and which function in a conventional manner.

The base end of support arm 18 is coupled to the adjacent end of carriage 2 by a flat, metallic flexure spring 26 secured by screws 30 to a curved section 32 of support arm 18 and by screws 34 set with a plate 35 securely attached to carriage 2. Flexure spring 26 acts in conjunction with curved section 32 to permit pivoting movement of arm 18 away from fixed transducer 14 to allow jacket cover 6 insertion and removal. Arm 18 engages a head stop member 33 at one position to define the limit of motion of arm 18 in the direction away from fixed transducer 14.

Support arm 18 is spring loaded by a head load spring 38 having one end connected to carriage 2 as by a pin in slot arrangement. The other end of spring 38 is connected to a head load adjust screw 40 contained within a treaded bore extending along a portion of arm 18. Spring 38 is held in tension and as a result a downward force is exerted on arm 18 which provides the required head load force. Rotation of screw 40 will cause movement of the top end of spring 38 to the left or right with accompanying increase or decrease of the force exerted by spring 38 on support arm 18.

Referring now to FIGS. 4 and 5, the structure, position and orientation of heads 16 and 26 is more clearly shown. It is seen that each of the heads has a spherical curvature of radius r facing disc 4 which rotates out of the plane of the drawing and about axis 5. The center-line of the read/write core of head 26 is offset or rotated in a first direction by an angle $\theta$ from an axis parallel to axis 5, and the center-line of the read/write core of head 16 is offset or rotated in the opposite direction by the same angle $\theta$ from an axis parallel to axis 5. The read/write cores of the heads are separated by a distance S sufficient to prevent crosstalk, which in conventional 48 track/inch systems is 4 tracks or 4/48 inches. The spherical surfaces are positioned such that tangents to the surfaces at the points where the heads are closest to the disc 4 are separated by a distance $w+d$ which is just slightly greater than the thickness d of disc 4. The vertical spacing between the spheres is denoted as "C". Using the line connecting the centers $\theta$ of the spherical surfaces of the heads as the hypotenuse of a right triangle having sides $2r + C$ and $S + 2r \sin \theta$, the geometry of the head placement and orientation is defined as: $(2r+w+d)^2 = (2r+c)^2 + (S+2r \sin \theta)^2$.

Due to the combined effects of the pliant nature of disc 4, the shape and orientation of heads 16 and 26, the penetration of head 16 into the nominal plane of disc 4, and the spring loading of head 26, disc 4 achieves a wavy shape in the vicinity of heads 16 and 26. It is noted that the shape, orientation and positioning of the heads permit the wavy shape to stabilize without the use of the stabilizing platforms of the prior art. The wavy shape of the disc 4 causes it to have a large wrap angle at each head whereby stresses are lowered due to their distribution over a large area. The reduced stress and the lack of stabilizing platforms provide a system with relatively low disc/head wear. In addition, the shape, orientation and positioning of the heads 16 and 26 permits the pliant head to be more massive and rigid which reduces head vibration and oscillations.

Figure 6:
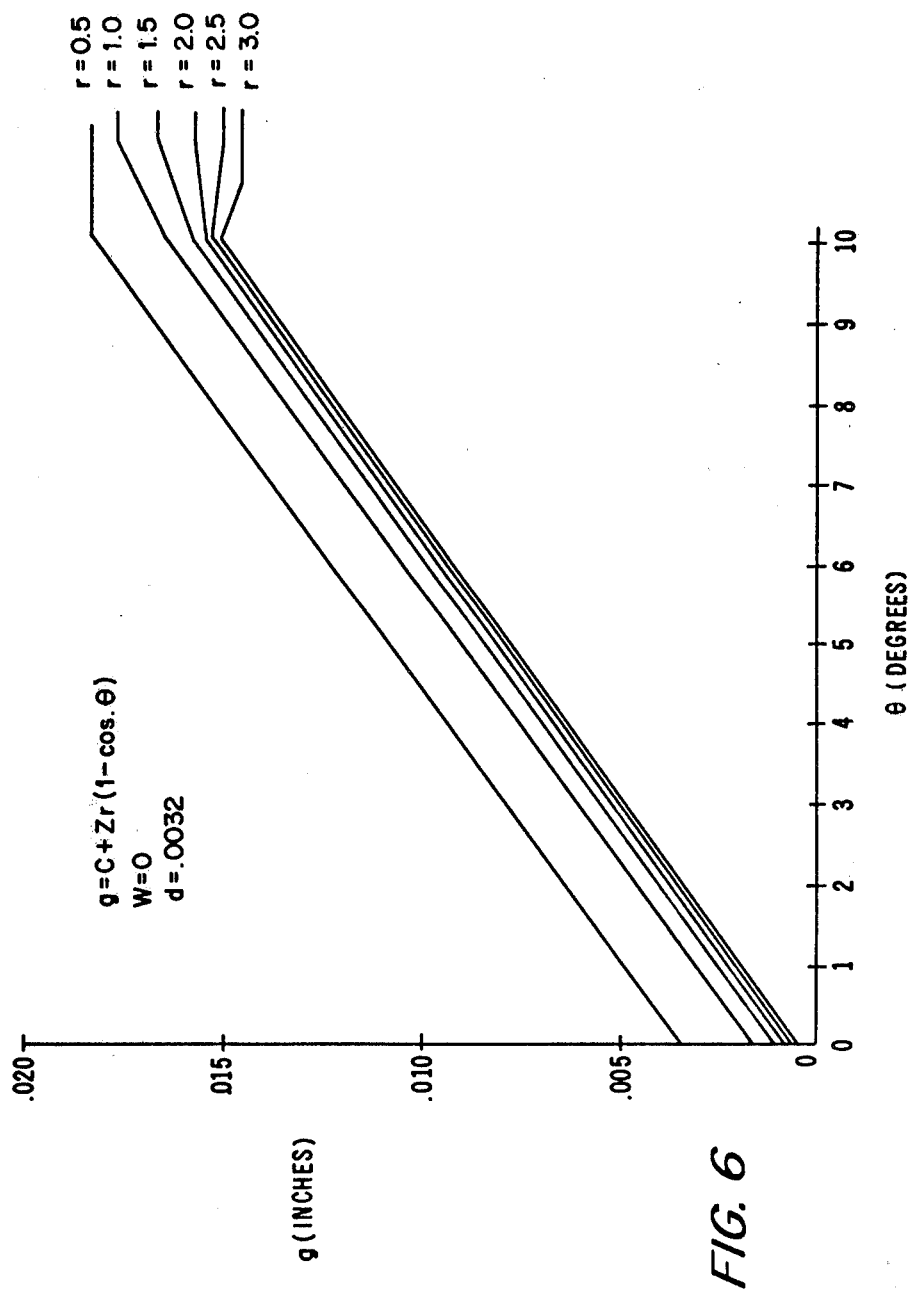
FIG. 6 is a plot equating different parameters of the head assembly of FIG. 1.

In a recording system, it is desired that the minimum spacing between the bearing surface of each head and the disc occur at the read/write gap of each head. The head system disclosed herein can achieve such minimum spacing at the desired positions by selecting appropriate values for head structure parameters, such as, radius r, angle $\theta$, and the force applied to the pliant head, as well as parameters of the disc such as its modulas of elasticity and thickness. Referring to FIG. 6, there is shown a plot which will provide acceptable distances g (as defined therein) for various rotation angles $\theta$ and radii r and a disc thickness of 0.0032". To date, it has been found that optimim head/disc spacing is achieved with such a disc at a rotation angle $\theta$ of $3\frac{1}{2}$ degrees and a radius r of $\frac{3}{4}$", which indicates a "g" of about 0.0075".

Another desired parameter of a recording system is constant spacing between the disc and head(s) in the vicinity of the head(s). The disclosed recording head system can provide such constant spacing. Verification that the constant spacing is achieved is accomplished by subjecting a system with the preferred parameters set forth herein before, glass heads and a transparent disc to analysis by monochromatic light. Due to light interference phenomena, interference fringes will occur at the periphery of regions of constant head/disc spacing. Referring to FIG. 7, it is seen that the verification procedure yields the innermost interference fringes "a" and "b" which encompass the read/write and erase cores of heads 16 and 26, respectively, thus establishing that the head/disc spacing was constant in the vicinity of the heads 16 and 26. The system should be designed so that the interference fringes do not extend to the contact point since in that instance the disc would be in contact with the heads and excessive wear could result and that the constant spacing region is sufficiently large to properly encompass the read/write and erase cores.

What is claimed is:

1. An apparatus for recording data on both sides of a pliant magnetic disc rotating about an axis comprising:
   a carriage member,
   a contilevered arm supported by said carriage member,
   a pair of transducer heads each having a curved surface, a first of said head being supported by said carriage member and the second of said heads being supported by said contilevered arm, said heads being radially spaced from said axis of rotation by different distances when said heads are in the recording position, and
   means for urging the curved surfaces of said heads toward each other with a force of sufficient magnitude to cause said heads to penetrate the nominal plane of said disc when said heads are in the recording position whereby said disc is forced to have a wavy contour over said curved surfaces of said heads,
   said supports for said heads angling said heads in opposite directions from axes parallel to said axis of rotation of said disc when said heads are in the recording position.

2. The apparatus of claim 1 wherein said curved surfaces are spherical.

3. The apparatus of claim 2 wherein said spherical surfaces have a radius of about $\frac{3}{4}$ inch and said angles are each about $3\frac{1}{2}$ degrees.

4. An apparatus for recording data on both sides of a pliant magnetic disc rotating about an axis comprising:
   a carriage member,
   a contilevered arm supported by said carriage member,
   a pair of transducer heads each having a curved surface, a first of said heads being supported by said carriage member and the second of said heads being supported by said contilevered arm, said heads being radially spaced from said axis of rotation by different distances when said heads are in the recording position, and
   means for urging the curved surfaces of said heads toward each other with a force of sufficient magnitude to cause said heads to penetrate the nominal plane of said disc when said heads are in the recording position whereby said disc is forced to have a wavy contour over said curved surfaces of said heads, said support for said first head orienting said first head in a first direction by an angle $\theta$ from a first axis parallel to said axis of rotation of said disc and said support for said second head orienting said second head in a direction opposite said first direction by the amount of said angle $\theta$ from a second axis parallel to said axis of rotation of said disc when said heads are in the recording position.

* * * * *